(12) United States Patent
Petersen et al.

(10) Patent No.: US 8,363,384 B2
(45) Date of Patent: Jan. 29, 2013

(54) METAL GETTER SYSTEMS

(75) Inventors: Ronald O. Petersen, Pine, AZ (US);
Richard C. Kullberg, Colorado Springs, CO (US); Luca Toia, Carnago (IT);
Sergio Rondena, Magenta (IT); Johnny Mio Bertolo, Fiume Veneto (IT)

(73) Assignee: Saes Getters S.p.A., Milan (IT)

( * ) Notice: Subject to any disclaimer, the term of this patent is extended or adjusted under 35 U.S.C. 154(b) by 557 days.

(21) Appl. No.: 12/381,609

(22) Filed: Mar. 13, 2009

(65) Prior Publication Data

US 2009/0237861 A1    Sep. 24, 2009

Related U.S. Application Data

(63) Continuation-in-part of application No. PCT/US2007/020172, filed on Sep. 17, 2007.

(60) Provisional application No. 60/844,879, filed on Sep. 15, 2006.

(51) Int. Cl.
*H01G 9/00* (2006.01)
*H01G 9/02* (2006.01)
*H01G 9/10* (2006.01)
*H05K 5/06* (2006.01)

(52) U.S. Cl. ......... 361/502; 361/503; 361/504; 361/518
(58) Field of Classification Search ............... 361/504, 361/505, 506, 507, 502, 503, 518
See application file for complete search history.

(56) References Cited

U.S. PATENT DOCUMENTS

| | | | |
|---|---|---|---|
| 6,746,584 B1 * | 6/2004 | Wang et al. | 204/425 |
| 2002/0064710 A1 * | 5/2002 | Kawakami et al. | 429/231.95 |
| 2004/0101686 A1 * | 5/2004 | Porta et al. | 428/403 |
| 2007/0076349 A1 * | 4/2007 | Dementiev et al. | 361/502 |
| 2007/0146965 A1 * | 6/2007 | Mitchell et al. | 361/502 |

* cited by examiner

*Primary Examiner* — Jayprakash N Gandhi
*Assistant Examiner* — Arun Ramaswamy
(74) *Attorney, Agent, or Firm* — TIPS Group (57) ABSTRACT

Metal getter systems for use in electronic devices are provided. The getter systems taught herein include compartmentalized, metal getter systems for use in electrolytic environments present within electrolytic devices, such as electrolytic capacitors, without the problem of getter passivation. Such systems (50) can include a composite getter system (10) inserted into a central portion of an electrolytic capacitor (50) having a container (51), electrodes (52), and electrical contacts (54,54').

16 Claims, 4 Drawing Sheets

METAL GETTER SYSTEMS

CROSS-REFERENCE TO RELATED APPLICATIONS

This application is a continuation-in-part of International Patent Application No. PCT/US2007/020172, filed Sep. 17, 2007, which claims the benefit of U.S. Provisional Patent Application No. 60/844,879, filed Sep. 15, 2006; both of which are hereby incorporated herein by reference.

BACKGROUND

1. Field of the Invention

The subject matter disclosed herein relates to metal getter systems for use in electronic devices. Particularly, the getter systems taught herein are useful in the electrolytic environment within electrolytic devices and, more particularly, include composite getter systems that can be used in electrolytic capacitors without passivation.

2. Description of the Related Art

Electronic devices are used extensively in many applications, and getters are used in the manufacture and operation of these important devices in countless industrial and consumer applications. A getter is typically composed of metal or a metal alloy that exhibits a chemical affinity for specific gases and, when introduced into an evacuated device, absorbs the targeted gaseous molecules that are present to create and maintain an appropriate vacuum in the device. Notably, there has been a long-felt need for a gaseous contaminant getter or sorber for liquid environments in which the getter is both efficient and resistant to passivation. Such liquid environments, for example, include those environments present in electrolytic devices, such as the electrolytic liquid environments of electrolytic capacitors.

Electrolytic devices include those devices in which the conduction of electricity is accompanied by a chemical action. The electrolytic capacitor is an example of an electrolytic device. The electrochemical double layer capacitor (EDLC), for example, is a supercapacitor and typically includes an airtight housing that encloses electrodes, typically formed of metal sheets, which are immersed in, or impregnated with, an electrolytic solution. The metal sheets are electrically coupled to the outside of the housing by a pair of electrical contacts. The problem is that capacitors can also contain contaminants that can damage the capacitor, sometimes beyond repair, unless the capacitor has some sort of contaminant removal mechanism. These contaminants can be gases, for example, and can be created during operation of the capacitor or by the desorption of such gases from various parts of the capacitor. One type of harmful gas is hydrogen.

The problem is that metal getters become passivated in liquid environments, such as the electrolytic environments of electrolytic capacitors. The term "passivation," as used herein, refers to a metal getter being rendered at least generally incapable of sorbing contaminants, such that the getter material is undesirable for its intended purpose. One attempted solution to the problem of passivation has been to create a "non-mixed" sorbing system, wherein the getters are not mixed with the electrolytic solution. Another attempted solution to the problem has been to create a "mixed sorbing system" by mixing select getters, such as liquid getters, with the electrolytic solution. An example of such as system is disclosed in International Patent Application PCT/IT2006/000343 in the name of SAES Getters SpA, hereby incorporated herein in its entirety by reference. An example of a mixed sorbing system using solid sorbers is described in JP 03-292712, hereby incorporated herein in its entirety by reference, wherein an additive including a particulate of platinum, palladium, or alloys thereof, is applied onto electrolytic solution-impregnated paper sheets. Unfortunately, the paper sheets are quite thin, often less than 10 μm in thickness, and may be easily damaged by the added particles and result in short-circuits within the capacitor.

Another attempted solution to the problem has included the use of polymeric barriers to shield the getter materials from the electrolyte. These barriers have allowed for the use of very effective getter materials in electrolyte environments, where the getter material would otherwise be subject to passivation. An example of such a system is disclosed in Italian App. Nos. MI2005A002344, by SAES Getters SpA, and MI2006A000056, by SAES Getters SpA, each of which is hereby incorporated herein in its entirety by reference. Unfortunately, such polymer barriers, although permeable to the contaminant to allow for sorption, are also designed to be impermeable to the electrolyte in order to protect the getter material from passivation, resulting in inefficiencies. Moreover, such polymeric systems tend to be expensive and difficult to use.

Accordingly, one of skill will appreciate a solid, composite getter system that is easy to use in an electrolyte environment and can be used to address passivation. Solid, composite getters have been used so far only in evacuated or gaseous environments, as they were never expected to be workable in liquid-containing environments known to passivate the getter materials.

SUMMARY

The teachings provided herein are directed to metal getter systems for use in electronic devices. Particularly, the getter systems taught herein are useful in an electrolytic environment within electrolytic devices and, more particularly, include composite getter systems that can be used in electrolytic capacitors without passivation.

In some embodiments, the teachings are directed to an electrolytic capacitor comprising at least two electrodes in an electrolytic environment and a solid, composite getter in contact with the electrolytic environment. In some embodiments, the electrolytic capacitor is an electrochemical double layer capacitor. The solid, composite getter can comprise, for example, a metal getter having a surface area in contact with a palladium compound.

In some embodiments, the solid composite getter system comprises a solid, composite getter in a porous container. The porous container can be used to retain the solid, composite getter in a desired region of an electrolyte solution in an electrolytic device. In these embodiments, the solid, composite getter can comprise a combination of (i) a metal getter comprising zirconium, titanium, or palladium, and (ii) a palladium compound comprising palladium, an oxide of palladium, or a palladium alloy. In these embodiments, the combination of the metal getter and palladium compound inhibits passivation of the getter material in the electrolyte solution. In some embodiments, the combination comprises a coating of the palladium compound on a surface of the metal getter, wherein at least 10% of the surface of the metal getter is coated by the palladium compound.

In some embodiments, the solid, composite getter system comprises a solid, composite getter in the form of a sheet. In these embodiments, the sheet can comprise a coextrusion product, such as a coextrusion product of the metal getter and the palladium containing material. Or, the sheet can be a foil of the metal getter, such as a foil having a thickness ranging from about 1 micron to about 100 microns and coated with a thin film of the palladium compound having a thickness ranging from about 1 to about 100 nanometers.

The porous container can be rigid and, in some embodiments, the porous container can be flexible. The solid, composite getter can contain preselected particle sizes, such as particle sizes ranging from about 10 μm to about 150 μm in diameter. In some embodiments, the pores in the porous container can be almost as large as the diameter of the smallest particles in the solid, composite getter.

The metal getter can comprise a component selected from the group consisting of Zr, Ti, Nb, Ta, and V metals; Zr alloyed with either Ti, Cr, Mn, Fe, Co, Ni, Al, Cu, Sn, Si, Y, La, any of the rare earth elements, or mixtures thereof; Ti alloyed with either Zr, Cr, Mn, Fe, Co, Ni, Al, Cu, Sn, Si, Y, La, any of the rare earth elements, or mixtures thereof; and, any mixture of the aforementioned metals and alloys. The metal getter can be, for example, a non-evaporable getter consisting of 70% zirconium, 24.6% vanadium, and 5.4% iron, by weight. In some embodiments, the metal getter can be, for example, a non-evaporable getter consisting of 80.8% zirconium, 14.2% cobalt, and 5% TR, by weight; wherein, TR is a rare-earth metal, yttrium, lanthanum, or mixtures thereof, and includes mischmetals.

The teachings are also directed to a compartmentalized, metal getter system, which can include the solid, composite getter system. In some embodiments, the teachings are directed to a compartmentalized, metal getter system comprising a metal getter in a porous container, wherein the porous container can be designed to be placed in a getter compartment in an electronic device. In some embodiments, the porous container can be rigid and, in some embodiments, the porous container can be flexible. In some embodiments, the porous container can be an enclosed porous cylinder, an enclosed porous parallelepiped, or a mesh enclosure. In some embodiments, the porous container can contain particles or pellets containing the metal getter and, in some embodiments, the particles or pellets can be in contact with a palladium compound.

In some embodiments, the particle sizes can range from about 10 μm to about 150 μm in diameter, and the pores in the porous container can be almost as large as the diameter of the smallest particles. In some embodiments, the compartmentalized, metal getter system includes a coating of the palladium compound on a surface of the metal getter, wherein at least 10% of the surface of the metal getter is coated by the palladium compound. See, for example, the solid, composite getters and flexible getter materials described in U.S. Pat. No. 6,682,817, to SAES Getters, SpA, and WO 2006/089068 to SAES Getters SpA, each of which is hereby incorporated herein in its entirety by reference.

In some embodiments, the metal getter comprises a component selected from the group consisting of Zr, Ti, Nb, Ta, and V metals; Zr alloyed with either Ti, Cr, Mn, Fe, Co, Ni, Al, Cu, Sn, Si, Y, La, any of the rare earth elements, or mixtures thereof; Ti alloyed with either Zr, Cr, Mn, Fe, Co, Ni, Al, Cu, Sn, Si, Y, La, any of the rare earth elements, or mixtures thereof; and, any mixture of the aforementioned metals and alloys. In some embodiments, the metal getter is a non-evaporable getter consisting of 70% zirconium, 24.6% vanadium, and 5.4% iron, by weight. In some embodiments, the metal getter is a non-evaporable getter consisting of 80.8% zirconium, 14.2% cobalt, and 5% TR, by weight; wherein, TR is a rare-earth metal, yttrium, lanthanum, or mixtures thereof, and includes mischmetals.

In some embodiments, the compartmentalized, metal getter system can comprise a metal getter in the form of a sheet, wherein the sheet is designed to be placed in a getter compartment in an electronic device. In these embodiments, the sheet can be a coextrusion product, a pressed and sintered sheet, a mesh, or a foil, comprising the metal getter. In some embodiments, the sheet can also comprise a palladium compound. In some embodiments, the sheet is a foil of the metal getter having a thickness ranging from about 1 micron to about 100 microns and coated with a thin film of the palladium compound having a thickness ranging from about 1 to about 100 nanometers.

The teachings are also directed to an electrochemical double layer capacitor comprising a sealed container having an inner wall portion, a central portion, a floor portion, and a getter compartment. The electrochemical double layer capacitor has at least two electrodes in an electrolytic environment and a solid, composite getter system in contact with the electrolytic environment. The solid, composite getter can include a porous container for retaining the solid, composite getter in the getter compartment. The solid, composite getter can comprise a combination of (i) a metal getter comprising zirconium, titanium, or palladium, and (ii) a palladium compound comprising palladium, an oxide of palladium, or a palladium alloy, wherein the combination of the metal getter and palladium compound inhibits passivation of the getter material in the electrolyte solution. In some embodiments, the porous container can be rigid and, in some embodiments, the porous container can be flexible.

In some embodiments, the getter compartment can be in the central portion of the sealed container. And, in some embodiments, the getter compartment can be in the floor portion of the sealed container. In some embodiments, the getter compartment can be adjacent to the inner wall portion of the sealed container.

In some embodiments, the electrochemical double layer capacitor can have a solid, composite getter system in the form of a sheet, and the sheet can be, for example, a coextrusion product, or a foil, of the metal getter and the palladium containing material. The foil of the metal getter can have a thickness ranging from about 1 micron to about 100 microns and be coated with a thin film of the palladium compound having a thickness ranging from about 1 to about 100 nanometers.

The electrochemical double layer capacitor can also have preselected particle sizes of solid, composite getter ranging from about 10 μm to about 150 μm in diameter, and the pores in the porous container can be almost as large as the diameter of the smallest particles in the solid, composite getter. In some embodiments, the combination of the metal getter and palladium compound comprises a coating of the palladium compound on a surface of the metal getter, wherein at least 10% of the surface of the metal getter is coated by the palladium compound.

The electrochemical double layer capacitor can have a metal getter comprising a component selected from the group consisting of Zr, Ti, Nb, Ta, and V metals; Zr alloyed with either Ti, Cr, Mn, Fe, Co, Ni, Al, Cu, Sn, Si, Y, La, any of the rare earth elements, or mixtures thereof; Ti alloyed with either Zr, Cr, Mn, Fe, Co, Ni, Al, Cu, Sn, Si, Y, La, any of the rare earth elements, or mixtures thereof; and, any mixture of the aforementioned metals and alloys. The metal getter can be a non-evaporable getter consisting of 70% zirconium, 24.6% vanadium, and 5.4% iron, by weight. Or, the metal getter can be a non-evaporable getter consisting of 80.8% zirconium, 14.2% cobalt, and 5% TR, by weight; wherein, TR is a rare-earth metal, yttrium, lanthanum, or mixtures thereof, and includes mischmetals.

The teachings are also directed to a method of producing an electronic device having a compartmentalized, metal getter system. In some embodiments, the method includes assembling an electronic device containing a compartmentalized, metal getter system; wherein, the metal getter system comprises a metal getter in a porous container. The porous container can be used to contain, for example, particles or pellets comprising the metal getter.

In these embodiments, the assembling includes placing the porous container in a getter compartment in the electronic device; and baking the electronic device containing the compartmentalized, metal getter system. In some embodiments, the porous container can be flexible and, in some embodiments, the porous container can be rigid. The porous container can be an enclosed porous cylinder, and enclosed parallelepiped, or a mesh enclosure. The porous container can be placed, for example, in a central portion of the electronic device, or a floor portion of the electronic device.

In some embodiments, the compartmentalized, metal getter system comprises a metal getter in the form of a sheet. In these embodiments, the assembling includes placing the sheet in a getter compartment in the electronic device; and baking the electronic device containing the compartmentalized, metal getter system. In some embodiments, the assembling includes placing the sheet in a getter compartment adjacent to the inner wall portion of the electronic device. The sheet can be a coextrusion product, a pressed and sintered sheet, a mesh, or a foil, comprising the metal getter. The foil can have a thickness, for example, ranging from about 1 micron to about 100 microns.

The compartmentalized, metal getter system can include a metal getter having preselected particle sizes ranging from about 10 μm to about 150 μm in diameter, and the porous container can have pores that are preselected to be almost as large as the diameter of the smallest particles in the solid, composite getter. In some embodiments, the electronic device can be an electrolytic capacitor, such as an electrochemical double layer capacitor, wherein the surface of the metal getter is in contact with a palladium compound.

The teachings herein are also directed to a method of removing a contaminant from an electronic device. The method includes placing a compartmentalized, metal getter system in an electronic device, wherein the metal getter system comprises a metal getter in a porous container; and creating conditions in which the metal getter will sorb a contaminant in the electronic device.

In these embodiments, the placing can include placing the porous container in a getter compartment in a central portion or a floor portion of the electronic device. In some embodiments, the porous contain can be rigid and, in some embodiments, the porous container can be flexible. The porous container can be an enclosed porous cylinder, and enclosed parallelepiped, or a mesh enclosure. Where the metal getter is in the form of a sheet, the placing can include placing the sheet in a getter compartment adjacent to the inner wall portion of the electronic device. The step of creating conditions in which the metal getter will sorb a contaminant in the electronic device can include, for example, operating the electronic device or applying energy to the solid, composite getter system to activate the solid, composite getter. Moreover, the metal getter system can also comprise a metal getter in the form of a sheet.

In some embodiments, the compartmentalized, metal getter system can comprise particles or pellets comprising the metal getter in a porous container. The metal getter can have preselected particle sizes ranging from about 10 μm to about 150 μm in diameter, and the porous container can have pores with preselected sizes that are almost as large as the diameter of the smallest particles in the solid, composite getter.

In some embodiments, the compartmentalized, metal getter system can comprise a sheet comprising the metal getter. In these embodiments, the sheet can be a coextrusion product, a pressed and sintered sheet, a mesh, or a foil, comprising the metal getter. In some embodiments, a foil of the metal getter can have a thickness ranging from about 1 micron to about 100 microns.

In some embodiments, the electronic device can be an electrolytic capacitor, such as an electrochemical double layer capacitor, wherein the surface of the metal getter is in contact with a palladium compound. And, in some embodiments, the electronic device can be an aluminum electrolytic capacitor. The aluminum electrolytic capacitor can comprise at least two aluminum electrodes in a hermetic electrolytic environment and a solid, composite getter in contact with the electrolytic environment. The solid, composite getter can comprise a metal getter having a surface area in contact with a palladium compound, wherein the combination of the metal getter and palladium compound inhibits passivation of the getter material by the electrolytic environment.

BRIEF DESCRIPTION OF THE DRAWINGS

The present invention is illustrated by way of example, and not by way of limitation, in the figures of the accompanying drawings and in which.

DETAILED DESCRIPTION

Metal getters can be used to remove contaminants from within electronic devices, and metal getter systems that are designed to be compartmentalized within an electronic device can have novel applications, such as the placement of a solid, composite metal getter into an electrolytic device. Metal getters can be in the form of particles having a preselected and predetermined size, such as powders, or they can be pressed into the form of pellets. After preselecting and predetermining the particle and pellet dimensions, the getters can be compartmentalized within an electronic device through the use of a porous container. The porous container will retain the metal getter and allow for contact between metal getter and its surrounding environment. The container can also be placed into a specifically positioned getter compartment in the electronic device to allow for a selective positioning and retention of the getter material. Likewise, metal getters can be formed into sheets. The sheets can be formed using any method known to one of skill such as, for example, extrusion of one metal, coextrusion of a combination of metals, pressing and sintering, or producing a mesh or foil of one or more metal getters. The sheets can optionally be coated with a second material such as, for example, a second metal getter having properties that differ from a first metal getter.

As such, the teachings provided herein include a novel method of removing a contaminant from an electronic device. The method includes first placing a compartmentalized, metal getter system in an electronic device, wherein the metal getter system comprises a metal getter in a porous container; and, then creating conditions in which the metal getter will sorb a contaminant in the electronic device. The metal getter system can also comprise a metal getter in the form of a sheet.

In these embodiments, the placing can include placing the porous container in a getter compartment in a central portion or a floor portion of the electronic device. In some embodiments, the porous contain can be rigid and, in some embodiments, the porous container can be flexible. The porous container can be an enclosed porous cylinder, and enclosed parallelepiped, or a mesh enclosure. Where the metal getter is in the form of a sheet, the placing can include placing the sheet in a getter compartment adjacent to the inner wall portion of the electronic device. The step of creating conditions in which the metal getter will sorb a contaminant in the electronic device can include, for example, operating the electronic device or, by applying energy to the solid, composite getter system to activate the getter. In some embodiments, the energy applied can be electromagnetic energy, for example, from laser source. Any method known to one of skill for creating conditions in which the metal getter will sorb a contaminant may be used in some embodiments.

The teachings herein provide a method of producing an electronic device having a compartmentalized, metal getter system. In some embodiments, the method includes assembling an electronic device containing a compartmentalized, metal getter system, wherein the system can include a metal getter in a porous container. In some embodiments, the electronic device can be an electrolytic capacitor, such as an electrochemical double layer capacitor, wherein the surface of the metal getter is in contact with a palladium compound.

One of skill may consider the electrochemical double layer capacitor to be an electrochemical capacitor rather than an electrolytic capacitor. The electrochemical double layer capacitor is in its own class as it has a very high energy density when compared to common capacitors. In some embodiments, the electrochemical double layer capacitor can have an energy density that is on the order of thousands of times greater than a high-capacity electrolytic capacitor. One of skill will appreciate, however, that the electrochemical double layer capacitor can be envisioned as comprising an electrolytic solution.

The porous container can be used to contain, for example, particles or pellets comprising the metal getter. In these embodiments, the assembling includes placing the porous container in a getter compartment in the electronic device; and baking the electronic device containing the compartmentalized, metal getter system. In some embodiments, the porous container can be flexible and, in some embodiments, the porous container can be rigid. The porous container can be an enclosed porous cylinder, an enclosed parallelepiped, or a mesh enclosure. The porous container can be placed, for example, in a central portion, or a floor portion, of the electronic device.

Accordingly, in some embodiments, the compartmentalized, metal getter systems require a sufficient heat tolerance to ensure that the getter systems can endure the high temperatures of the baking process used in producing some electrolytic devices. A sufficient heat tolerance would allow the composite getter system to be installed into an electrolytic capacitor before baking, for example, rather than adding the composite getter system as one of the last production steps. Accordingly, providing a compartmentalized, metal getter system with a sufficient heat tolerance for baking will provide one of skill with added flexibility and choices in the selection of production processes.

The embodiments taught herein can be used, for example, to remove gaseous contaminants from environments containing a liquid, such as electrolytic environments in electrolytic devices. In these environments, the solid, composite getters are exposed to an electrolytic solution, which usually includes at least a solvent and an ionic salt, or ionizing compound. The metal getter systems taught herein are, in fact, useful in the electrolytic environment within electrolytic devices and, more particularly, can be used in electrolytic capacitors without passivation.

An "electrolytic environment" can refer, for example, to any environment in an electronic device containing a solvent and an ionizing compound. In some embodiments, the electrolytic environment includes an area in an electronic device that contains electrolyte, which is an ionic conductor of electricity and contains charged atoms or molecules, including the contents of the area as they exist before, during, or after operation of the electronic device. In some embodiments, the electrolytic environment can be specific and may include, for example, boric acid or sodium borate in aqueous solution together with various sugars or ethylene glycol added to slow evaporation. In some embodiments, the electrolyte environment can include a free flowing electrolyte solution and, in some embodiments, the electrolyte environment can include a material saturated with electrolyte solution, such that movement of the electrolyte solution occurs through the saturated material. In some embodiments, the electrolyte environment can include the solid oxide electrolyte present in some electrolytic devices.

In the case of electrochemical double layer capacitors, for example, where acetonitrile and propylene carbonate are frequently employed as solvents, and tetraethyl ammonium tetrafluoroborate is used as a salt, it has been discovered that metal getters combined with a palladium compound do not lose gas-sorption properties, meaning that they do not become passivated. Although they exhibit a significantly reduced absorption capacity when used within electrolytic capacitors, these solid, composite metal getter systems surprisingly resist passivation and retain a sufficient sorption capacity for use in an electrolytic environment.

The term "solid, composite getter" can refer to a combination of a metal getter and at least a second material that is combined with the metal getter, wherein the second material (i) may, or may not, have the function of removing contaminants and (ii) does inhibit passivation of the metal getter material in an electrolytic environment. In some embodiments, a solid, composite getter can be obtained by coating a surface of a suitable metal getter material with a palladium compound, such as palladium, palladium oxide, palladium-silver alloys or palladium compounds. In some embodiments, other palladium compounds and materials having similar properties may be used.

In some embodiments, from about 1% to about 100% of the surface of a metal getter material can be coated to form a solid, composite getter. In some embodiments, from about 2% to about 99%, from about 5% to about 95%, from about 10% to about 90%, 20% to about 50%, from about 50% to about 99%, or any range therein, of the surface of a metal getter can be coated to form a solid composite getter for the uses taught herein. In some embodiments, from about 10% to about 90% of the surface of the metal getter is coated with a palladium compound. In some embodiments, at least 10% of the surface of the metal getter is coated with a palladium compound. In some embodiments, the palladium coating comprises a palladium-silver alloy containing up to 30 atomic percent silver.

In some embodiments, the metal getters can include the zirconium-based alloys described, for example, in U.S. Pat. Nos. 3,203,901; 4,071,335; 4,306,887; 4,312,669; 4,668,424; and, 5,961,750, each of which is hereby incorporated herein in its entirety by reference. In some embodiments, Zr—V—Fe alloys or equivalents can be used to form a metal getter substrate for the palladium coating or equivalent. In some embodiments, the metal getter comprises a component selected from the group consisting of Zr, Ti, Nb, Ta, and V metals; Zr alloyed with either Ti, Cr, Mn, Fe, Co, Ni, Al, Cu, Sn, Si, Y, La, any of the rare earth elements, or mixtures thereof; Ti alloyed with either Zr, Cr, Mn, Fe, Co, Ni, Al, Cu, Sn, Si, Y, La, any of the rare earth elements, or mixtures thereof; and, any mixture of the aforementioned metals and alloys. In some embodiments, the metal getter is a non-evaporable getter consisting of 70% zirconium, 24.6% vanadium, and 5.4% iron, by weight. In some embodiments, the metal getter is a non-evaporable getter consisting of 80.8% zirconium, 14.2% cobalt, and 5% TR, by weight; wherein, TR is a rare-earth metal, yttrium, lanthanum, or mixtures thereof, and includes mischmetals. See, for example, U.S. Pat. No. 5,961,750 and SAES getter St787® (SAES Getters SpA).

In some embodiments, the solid, composite getters may be used in the form of powders, pellets derived from the powders, sheets derived from the powders, sheets derived from coextrusions, and can sometimes be manufactured in the form of meshes. Pellets and sheets can be produced, for example, by pressing the powders in suitable molds, and the pressed sheets may be sintered. One of skill will appreciate that the solid, composite getters can also come in a variety of other configurations that may be useful for particular applications and can be produced by a variety of known processes.

In some embodiments, a palladium coating should have a thickness of less than about 5 microns. In some embodiments, the palladium coating can have a thickness range from about 1 micron to about 20 microns, from about 2 microns to about 15 microns, from about 3 microns to about 12 microns, from about 4 microns to about 10 microns, from about 5 microns to about 7 microns, or any range therein It should be noted that greater thicknesses consume larger quantities of palladium, which is expensive, and may be unnecessary, given the high hydrogen sorption capacity of palladium.

The palladium may be deposed onto a metal getter particle using any of many techniques known to one of skill. For coverages less than 100%, evaporative or sputtering techniques can be used, in which the metal getter particles are placed within a chamber maintained under vacuum in the form of a thin powder bed on a sample holder beneath a palladium source. For evaporative depositions, the palladium source can be a metal wire of palladium that is heated by passing current through it to boil off palladium. In sputtering depositions, the palladium source can be a target that is maintained at a negative potential and bombarded with positive ions, typically argon or another inert element. Sputtering may be preferable when the palladium source is a palladium-silver alloy. Partial or total coverage can also be obtained by using chemical vapor deposition. This technique involves evaporating a volatile or volatilizable precursor species that includes the element or compound to be deposited. Organometallic palladium compounds are preferable when using chemical vapor deposition to form a coating.

Liquid phase impregnation can be used to obtain coverages up to about 100%. Metal getter particles are stirred into a solution of a palladium compound in a suitable solvent and maintained at a temperature between about 25° C. and about 50° C. In some embodiments, the solvent can be water, an alcohol, or a mixture thereof. Suitable palladium compounds include, for instance, palladium nitrate, palladium acetate, and salts of the tetraminic palladium complex. The solution is dried by evaporating off the solvent, and the resulting dry powder is heated at about 500° C. under vacuum for about 5 minutes to about 45 minutes convert remaining palladium salt on the surface of the getter to palladium oxide or palladium. Palladium oxides can be reduced to palladium by the metal getter itself. The getter particles may be precharged with hydrogen (hydrogenated) before the coating is deposited and then thermally treated to clean the surface of the exposed portion of the getter particle and improve the sorption properties for gases other than hydrogen.

Figure 1:
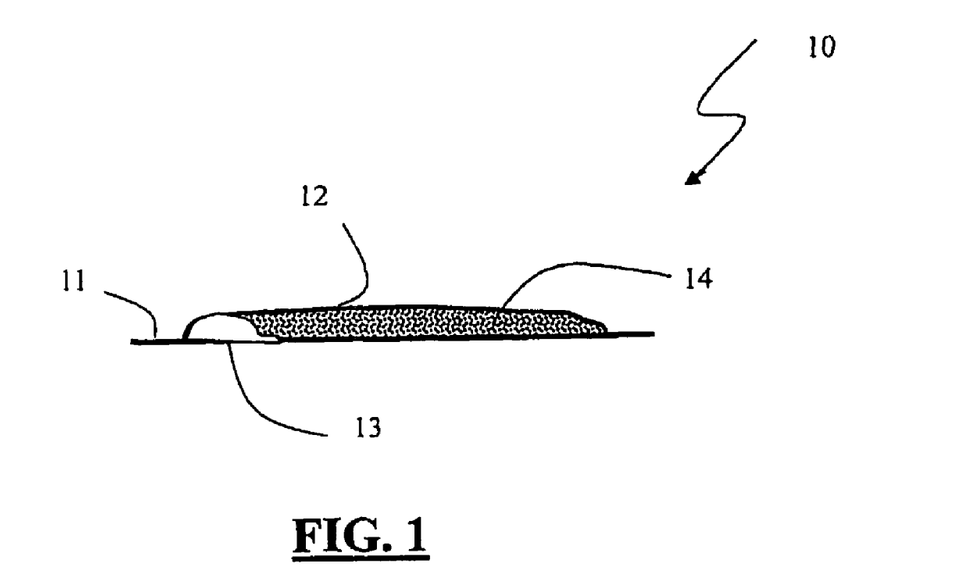
FIG. 1 illustrates a compartmentalized, metal getter system in which a solid, composite getter is sandwiched between layers of a porous material, according to some embodiments.

FIG. 1 illustrates a compartmentalized, metal getter system in which a solid, composite getter is sandwiched between layers of a porous material, according to some embodiments. Composite getter system 10 includes including two gas-permeable sheets 11,12 that are welded together at 15 and define a cavity 13, such that the combination of the sheets 11,12 and cavity 13 serves as a container for a solid, composite getter 14 in powder form that can be placed into a device, such as an electrolytic capacitor. This system can be squeezed and manipulated into a given portion of an electronic device that requires sufficient deformability to allow for placement of the system.

If used in an electrolytic capacitor, the container formed by sheets 11,12 and cavity 13 must generally be compatible with the electrolytic environment. Accordingly, one of skill will understand that various materials can be used to form the container. Sheets 11,12 can be for example, polymeric sheets made a wide variety of polymers known to one of skill in the art. In some embodiments, the sheets can be made from polymers that can include a component selected from the group consisting of polytetrafluoroethylene, polyethylene, and polypropylene. In some embodiments, the polymeric sheets can be made from a combination of polymers, copolymers, and combinations thereof. Sheets 11, 12 can also be in form of permeable foils, woven fabrics, non-woven fabrics, or metallic nets.

Figure 2:
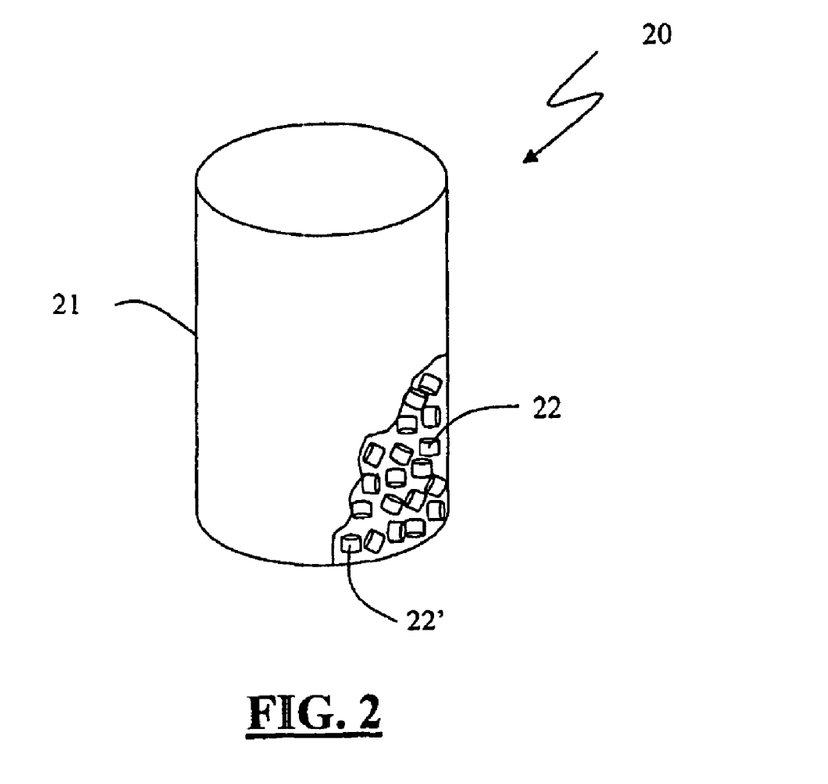
FIG. 2 is a partially broken perspective view of a compartmentalized, metal getter system in which a solid, composite getter in the form of pellets is provided in a rigid polymeric container, according to some embodiments.

FIG. 2 is a partially broken perspective view of a compartmentalized, metal getter system in which a solid, composite getter in the form of pellets is provided in a rigid polymeric container, according to some embodiments. The system includes a composite, metal getter. Composite getter system 20 includes a porous container 21 and a solid, composite metal getter 22,22'. The container 21 may be sufficiently rigid so as to retain its shape during installation into a capacitor, such as when its installed, for example, into a suitably configured cavity of an electrolytic capacitor. As described above, one of skill will appreciate that various materials can be used for the container 21. In some embodiments, the container can be made of poly(propylene) or poly(ethylene).

In some embodiments, a suitable preselected particle size should range from about 10 µm to about 150 µm in diameter, from about 20 μm to about 100 μm in diameter, from about 30 μm to about 70 μm in diameter, from about 50 μm to about 125 μm in diameter, or any range therein. The diameter is considered to be merely the average distance across opposite sides of a particle, regardless of the shape of the particle. These sizes can be predetermined, for example, by any method known to one of skill such as, for example, through the use of sieves. In some embodiments, the solid, composite getter can include either a narrow or broad range of sizes and size distributions.

It should be appreciated that the geometry, wall thickness, pore distribution, and pore size of the material used to form any of the porous containers taught herein can vary greatly. The size of the pores should be selected so that the average pore size does not exceed the size of the smallest predetermined particle size in order to retain the particles. The minimum particle size can be controlled by sieving the powders and choosing the desired fraction or fractions. For example, if the getter material is used in a powder form, a suitable pore size may range from less than about 10 μm to less than about 150 μm in diameter, where the diameter again is considered to be merely the average distance across opposite sides of a porous opening, regardless of the shape of the opening. In some embodiments, the pores in the porous container can be almost as large as the diameter of the smallest particles in the solid, composite getter and still retain the solid, composite getter in the composite getter system.

In some embodiments, the compartmentalized, metal getter system comprises a metal getter in the form of a sheet. In these embodiments, the assembling includes placing the sheet in a getter compartment in the electronic device; and baking the electronic device containing the compartmentalized, metal getter system. In some embodiments, the assembling includes placing the sheet in a getter compartment adjacent to the inner wall portion of the electronic device. The sheet can be a coextrusion product, a pressed and sintered sheet, a mesh, or a foil, comprising the metal getter and, optionally a second metal getter. The foil can have a thickness, for example, ranging from about 1 micron to about 100 microns and can optionally have a coating of the second metal getter. In some embodiments, the second metal getter can be a palladium compound. In some embodiments, the sheet is a foil of the metal getter having a thickness ranging from about 1 micron to about 100 microns and coated with a thin film of the palladium compound having a thickness ranging from about 1 to about 100 nanometers.

In some embodiments, the metal getter sheet is a hydrogen-removing film. In these embodiments, the hydrogen removing film can be used to comply with stringent requirements set by microelectronic hermetic packages suffering from hydrogen-induced problems such as, for example, gate failure in gallium-arsenide based microelectronic devices, or insulation degradation in super-insulated cryogenic systems. An example of such a hydrogen-removing film is REL-HY or HIGH-CAPACITY REL-HY (available from SAES Getters), which as a titanium-palladium double-layered thin film getter. In some embodiments, the hydrogen-removing film is configured to comprise a titanium layer having a thickness of about 200 micrometers and a palladium layer having a thickness of about 200 nanometers. In some embodiments, the titanium layer can have a thickness ranging from about 20 micrometers to about 400 micrometers, from about 50 micrometers to about 300 micrometers, from about 100 micrometers to about 200 micrometers, from about 125 micrometers to about 250 micrometers, or any range therein. In some embodiments, the palladium layer can have a thickness ranging from about 20 nanometers to about 400 nanometers, from about 50 nanometers to about 300 nanometers, from about 100 nanometers to about 200 nanometers, from about 125 nanometers to about 250 nanometers, or any range therein. In some embodiments, the hydrogen-removing film can be coated on package lids, or metallic, ceramic, and glass substrates. In some embodiments, the hydrogen-removing film can be patterned to nearly any desired geometry. In some embodiments, the hydrogen-removing film does not require getter activation.

In some embodiments, the solid, composite getter can be made from a foil of getter coated with a thin porous material. For example, a thin titanium foil can be coated with a thin palladium layer. Suitable thicknesses for the titanium can range, for example, from tens of microns to a few hundred microns, whereas the palladium coating should be in the nanometer range. In some embodiments, the palladium coating can range in thickness from about 10 nanometers to about 100 nanometers, from about 20 nanometers to about 90 nanometers, from about 30 nanometers to about 80 nanometers, from about 15 nanometers to about 75 nanometers, from about 20 nanometers to about 50 nanometers, or any range therein. Since the solid, composite getters taught herein do not always need to be enclosed to avoid passivation, meaning that they can be in contact with a liquid environment such as an electrolytic environment, manufacturing them a bendable metallic foil allows them to be easily integrated within electrolytic devices of a variety of configurations, shapes and sizes.

In embodiments that include a titanium getter combined with palladium, an unexpected and surprising result was found. A higher the amount of palladium resulted in a higher sorption speed for the solid, composite getter. This result was particularly unexpected and surprising when the solid, composite getter was a thin film of titanium coated with a thin layer of palladium. One of skill would not ordinarily choose a titanium/palladium combination, since the art has shown the titanium/palladium combination to be rather poorly suited for use within electrolytic capacitors. Nevertheless, the use of higher amounts of palladium has surprisingly made the titanium/palladium combination useful in electrolytic capacitors. Moreover, the system is compatible with known application requirements, and its mechanical flexibility through use of thin metallic layers makes it particularly desirable for some specific embodiments where the ability to manipulate the getter material is useful.

Figure 3:
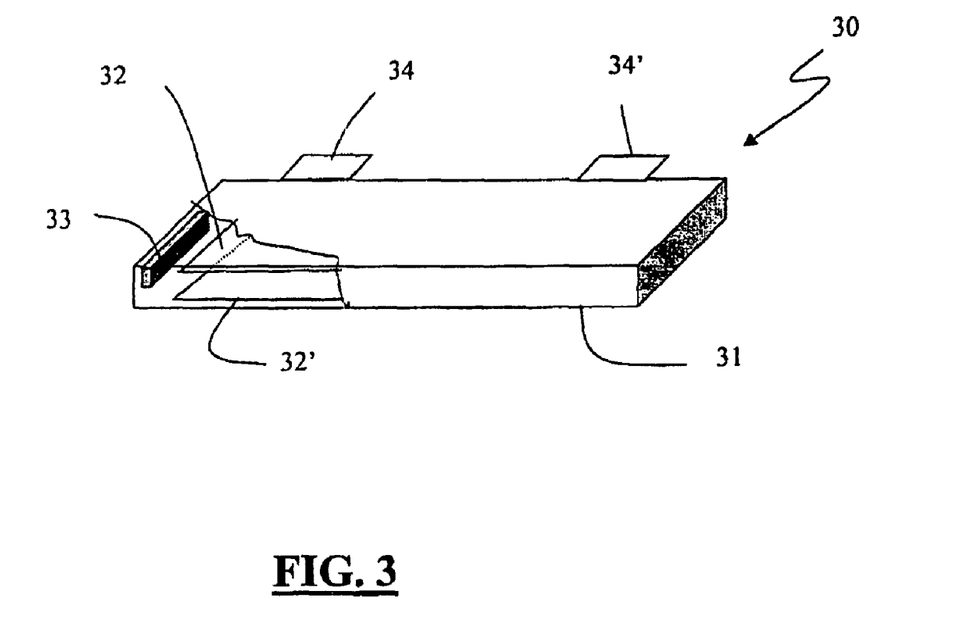
FIG. 3 is a partially broken perspective view of an electrolytic capacitor including a solid, composite getter, according to some embodiments.

FIG. 3 is a partially broken perspective view of an electrolytic capacitor including a solid, composite getter according to some embodiments. The capacitor 30 includes a hermetic container 31 containing an electrolytic solution (not shown), electrodes 32,32' immersed into the electrolytic solution, electrical contacts 34,34' provided on the electrodes, and a solid, composite getter system or material 33. Only two electrodes are shown in FIG. 3 for simplicity, and in some embodiments, electrolytic capacitors may contain many such electrodes, in which tens of electrodes are provided.

Figure 4:
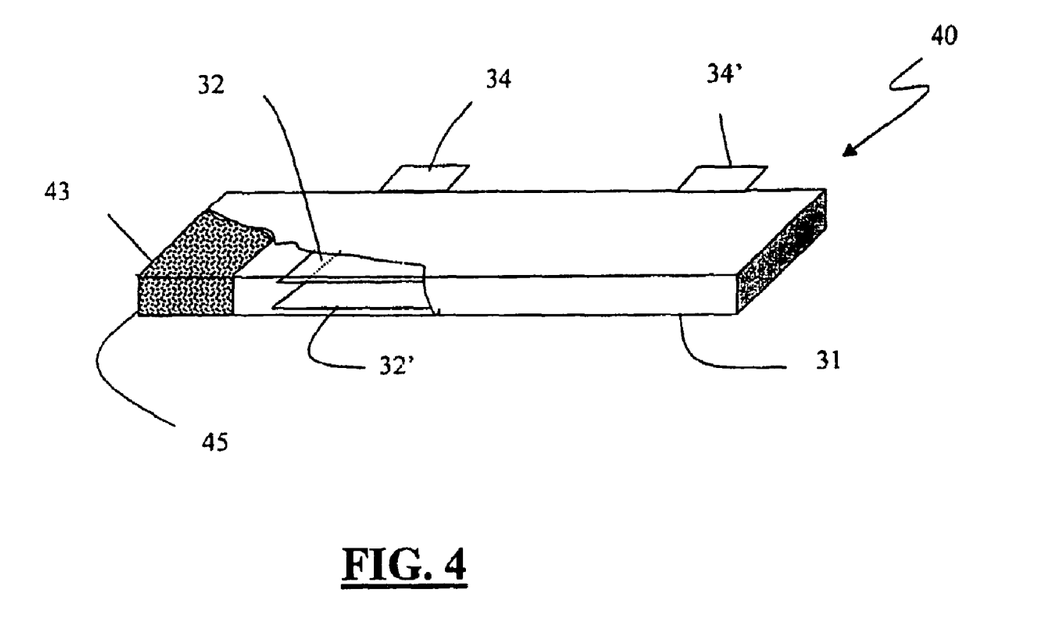
FIG. 4 is a partially broken perspective view of an electrolytic capacitor including a solid, composite getter and a getter compartment, according to some embodiments.

FIG. 4 is a partially broken perspective view of an electrolytic capacitor including a solid, composite getter and a getter compartment, according to some embodiments. Capacitor 40 contains a getter compartment 43 for holding solid, composite getter 45. The getter compartment 43 is essentially an empty portion of the hermetic container 31 of the electrolytic capacitor 40 that communicates with the portion of the capacitor holding the electrodes 32,32' and electrolyte. Electrolyte can be added to fill the getter compartment 43 as needed.

Figure 5:
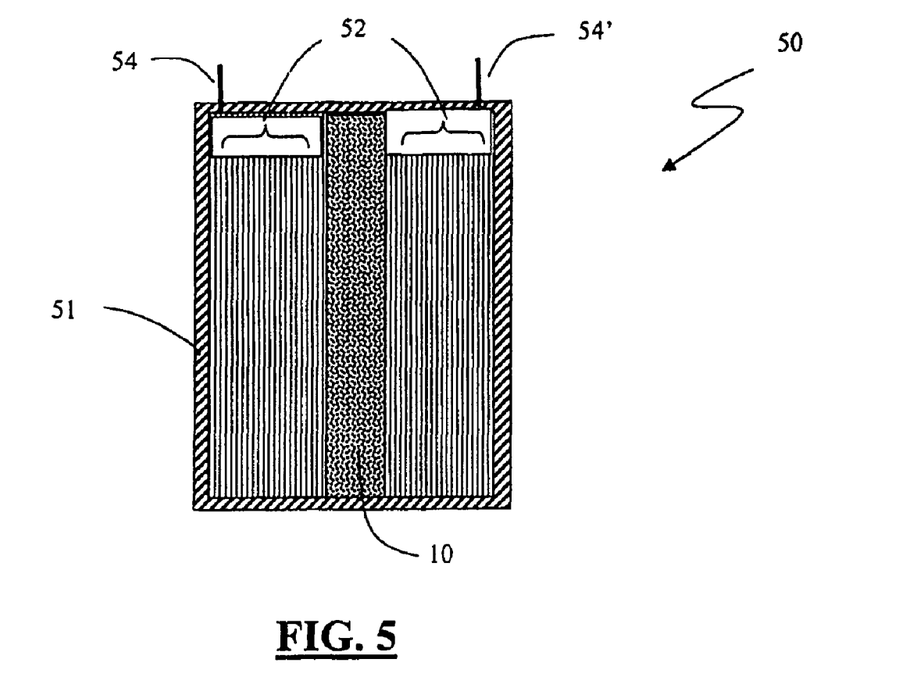
FIG. 5 is a cross-sectional view of an electrolytic capacitor including a solid, composite getter in a central portion of the capacitor, according to some embodiments.

FIG. 5 is a cross-sectional view of an electrolytic capacitor including a solid, composite getter in a central portion of the capacitor, according to some embodiments. The composite getter 10 system may be inserted into a central portion of the electrolytic capacitor 50. The capacitor 50 has a cylindrical geometry and is viewed in cross section along its axis. The capacitor 50 has a hermetic container 51 that encloses electrodes 52 which are thin, metallic sheets rolled to form a spiral and illustrated by the vertical parallel lines. The electrodes 52 are immersed in an electrolyte (not shown), and electrical contacts 54,54' enable communication between the electrodes 52 and the outside of the hermetic container 51. In this example, the solid, composite getter 10 is in the central portion of the capacitor 50, which is particularly suitable when there is a preference for placing a rigid composite getter system within a pre-allocated space in a capacitor.

Although FIG. 5 shows a cylindrical geometry, one of skill will recognize that a multitude of geometries will provide the intended function, and the selection of a particular geometry may be application specific. For example, there are several different cylindrical forms possible, as cylinders can be in any of a variety of cross-sectional shapes, such as a square rectangle, ellipse, etc. As such, one of skill will understand that this teaching does not limit the possible shapes of the containers used to enclose the components of a device. For example, a capacitor container can be in the form of a parallelepiped, of any variation, which may be desirable in some embodiments.

Figure 6:
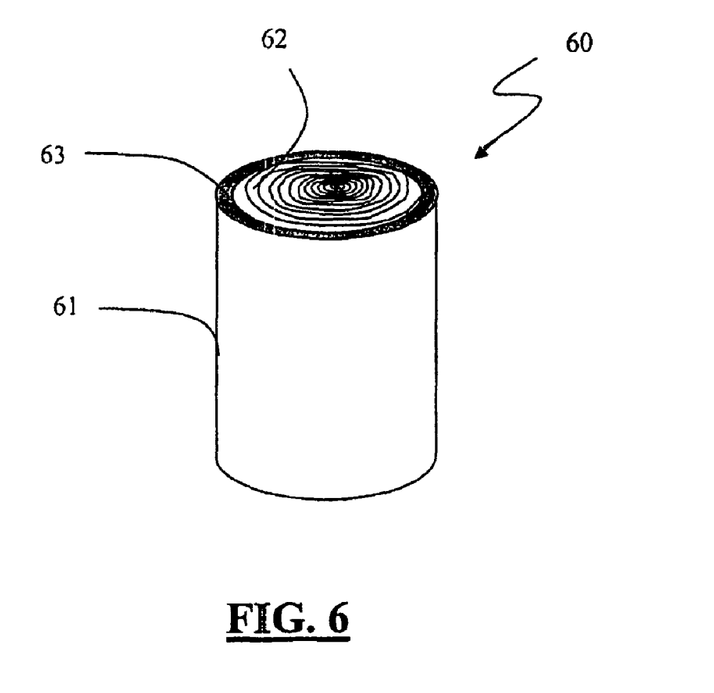
FIG. 6 illustrates a cylindrical capacitor with spiral electrodes and a thin foil getter, according to some embodiments.

FIG. 6 illustrates a cylindrical capacitor with spiral electrodes and a thin foil getter, according to some embodiments. A solid, composite getter system 63 is placed on the inner wall portion of a hermetic container 61, and the electrodes 62 of the capacitor 60 are wound around each other. In this embodiment, a particular useful solid, composite getter can include the titanium foil, due to its flexibility. For example, as discussed above, a titanium foil covered with a thin palladium layer has been found to be useful in electrolytic environments.

Figure 7:
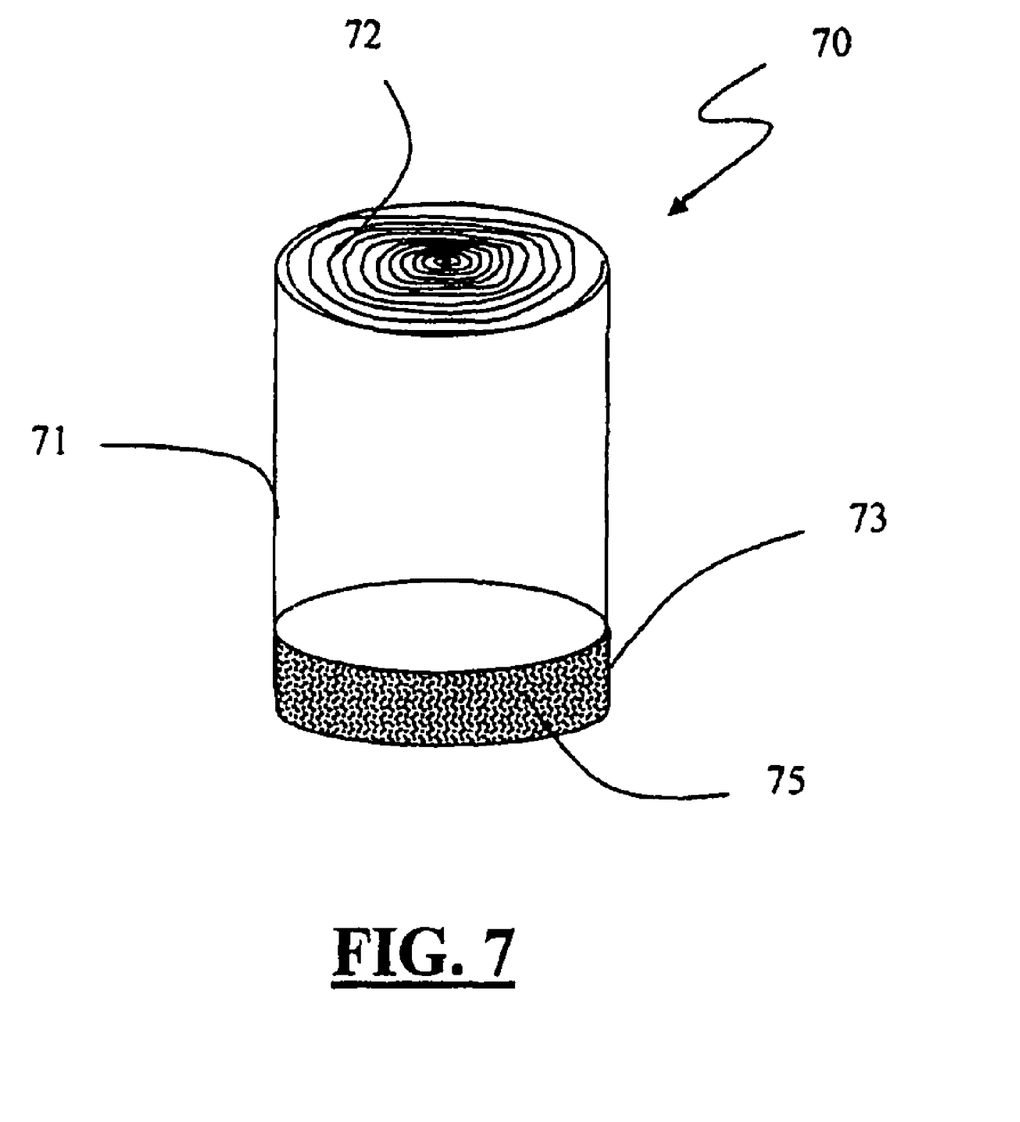
FIG. 7 illustrates a cylindrical capacitor with spiral electrodes and a getter compartment, according to some embodiments.

FIG. 7 illustrates a cylindrical capacitor with spiral electrodes and a getter compartment, according to some embodiments. Electrolytic capacitor 70 has a hermetic container 71 and electrodes 72. The capacitor 70 also has a getter compartment 73 located in the floor portion of the capacitor that includes a solid, composite getter system 75. This embodiment has the advantage that there are less geometrical constraints as a result of the manner in which the composite getter system is positioned relative to the electrical contacts.

In some embodiments, the electronic device can be an aluminum electrolytic capacitor. The aluminum electrolytic capacitor can comprise at least two aluminum electrodes in a hermetic electrolytic environment and a solid, composite getter in contact with the electrolytic environment. The solid, composite getter can comprise a metal getter having a surface area in contact with a palladium compound, wherein the combination of the metal getter and palladium compound inhibits passivation of the getter material by the electrolytic environment.

One of skill will appreciate that, aluminum electrolytic capacitors can be constructed from two conducting aluminum electrodes and, in some embodiments, the electrodes can be in the form of foils. In some embodiments, one of the electrodes is coated with an insulating oxide layer, and a paper spacer soaked in electrolyte. The foil insulated by the oxide layer acts as the anode, whereas the liquid electrolyte and the second foil act as the cathode. In some embodiments, the electrodes can be in a stack that is rolled up, fitted with pin connectors, and placed in a cylindrical aluminium casing. In some embodiments, axial leads can come from the center of a circular face of the cylinder, or two radial leads or lugs on one of the circular faces. The layer of insulating aluminum oxide on the surface of the aluminum plate acts as the dielectric, and the thinness of this layer allows for a relatively high capacitance in a small volume. In some embodiments, the aluminum oxide layer can withstand an electric field strength of the order of $10^9$ volts per meter, wherein the combination of high capacitance and high voltage result in high energy density.

EXAMPLE

Powders of a metal getter having composition by weight of Zr 70%—V 24.6%—Fe 5.4% are sieved to recover a getter powder having a grain size fraction ranging from about 53 μm to about 128 μm. 100 g of this fraction is added to a solution prepared by dissolving 0.5 g of palladium nitrate dihydrate, $Pd(NO_3)_2 \times 2\ H_2O$, in 40 ml distilled water in a glass flask. The flask is connected to a Rotavapor®, and the solution is heated to 70° C. and maintained for 5 hours of stirring, resulting in the evaporation of water and deposition of palladium nitrate onto the surface of the getter powder. The powders are then subjected to a thermal treatment at 500° C. under vacuum for 3 hours and allowed to cool to room temperature for about the next 16 hours. As a result, the palladium nitrate decomposes into metallic palladium that forms "islands" on the surface of the grains of the getter material. The nominal amount of palladium is equal to 0.2% by weight of the solid, composite getter.

The hydrogen sorption properties of the solid, composite getters are evaluated by using a sorption testing system having sample chamber connected to a dosing chamber through a needle valve. The sample chamber and the dosing chamber have volumes of 1 L. The sorption testing system is equipped with gauges for measuring the total pressure in the two chambers and connected to a pumping system that is based on a turbomolecular pump as the main pump.

300 mg of the palladium-coated powder is placed in the sample chamber, as described above, and a container of solvent (acetonitrile) that can be opened or closed using a needle valve, is also connected to the sample chamber. The sorption testing system is evacuated and then isolated from the pumping system. With the needle valve between sample and dosing chamber closed, the acetonitrile container is opened, allowing the vapors of this compound to saturate the sample chamber. Hydrogen is fed to the dosing chamber until a pressure of 540 hPa is reached; the needle valve is then opened, allowing hydrogen to diffuse into the sample chamber: under these conditions, at the beginning of the test the partial pressure of hydrogen in the sample chamber is 266 hPa. The solid, composite getter immediately starts to sorb hydrogen, and the pressure decrease in the sample chamber is monitored. The test is stopped when the pressure reaches a steady value. At the end of the test, the powders are extracted from the sample chamber and analyzed for hydrogen content using a LECO RH-402 analyzer; the quantity of sorbed hydrogen, normalized by the weight of getter material, is 107 (hPa×l/g).

The procedure described above is repeated starting with 1 g of palladium nitrate dihydrate, obtaining a composite material with a nominal amount of 0.4% by weight of palladium. The sorption test is repeated with this second sample, obtaining in the end a quantity of sorbed hydrogen equal to 95 (hPa×l/g).

Similar tests run with non-coated getter materials have resulted in null hydrogen sorption.

While various exemplary embodiments have been described, those skilled in the art will realized that there are many alterations, modifications, permutations, additions, combinations, and equivalents which fall within the true spirit and scope of the teachings. It is therefore intended that the preceding descriptions not be read by way of limitation but, rather, as examples with the broader scope of the concepts disclosed herein.

We claim:

1. An electrolytic capacitor, comprising:
   at least two electrodes in a hermetic electrolytic environment; and
   a solid, composite getter for the sorption of gas in contact with the electrolytic environment and comprising a metal getter having a surface area in contact with a palladium compound, wherein the combination of the metal getter and palladium compound inhibits passivation of the getter material by the electrolytic environment;
   wherein the solid, composite getter comprises a combination of (i) a metal getter comprising zirconium or titanium and (ii) a palladium compound comprising palladium, an oxide of palladium, or a palladium alloy, wherein the combination of the metal getter and palladium compound inhibits passivation of the getter material by the electrolyte environment;
   wherein the composite getter is in the form of a sheet for retaining the metal getter in a desired region of an electrolyte solution in an electrolytic device; and
   wherein the sheet is a foil of the metal getter having a thickness ranging from about 20 microns to about 400 microns and coated with a thin film of the palladium compound having a thickness ranging from about 20 to about 400 nanometers.

2. An electrolytic capacitor comprising:
   at least two electrodes in a hermetic electrolytic environment; and
   a solid, composite getter for the sorption of gas in contact with the electrolytic environment and comprising a metal getter having a surface area in contact with a palladium compound, wherein the combination of the metal getter and palladium compound inhibits passivation of the getter material by the electrolytic environment;
   wherein the solid, composite getter comprises a combination of (i) a metal getter comprising zirconium or titanium and (ii) a palladium compound comprising palladium, an oxide of palladium, or a palladium alloy;
   wherein the palladium compound is a thin film has a thickness ranging from about 20 to about 400 nanometers; and
   wherein the composite getter is located in a porous container for retaining the metal getter in a desired region of the electrolytic capacitor.

3. The electrolytic capacitor of claim 2, wherein the composite getter contains preselected particle sizes ranging from about 10μm to about 150μm diameter, and the pores in the porous container are almost as large as the diameter of the smallest particles in the metal getter.

4. An aluminum electrolytic capacitor, comprising:
   at least two aluminum electrodes in a hermetic electrolytic environment; and,
   a solid, composite getter for the sorption of gas in contact with the electrolytic environment and comprising a metal getter having a surface area in contact with a palladium compound, wherein the combination of the metal getter and palladium compound inhibits passivation of the getter material by the electrolytic environment;
   wherein the palladium compound is a thin film said surface area of said metal getter and having a thickness ranging from about 20 to about 400 nanometers.

5. The aluminum electrolytic capacitor of claim 4, wherein the solid, composite getter comprises a combination of (i) a metal getter comprising zirconium or titanium and (ii) a palladium compound comprising palladium, an oxide of palladium, or a palladium alloy, wherein the combination of the metal getter and palladium compound inhibits passivation of the getter material by the electrolyte environment.

6. The aluminum electrolytic capacitor of claim 5, wherein the composite getter is in the form of a sheet for retaining the metal getter in a desired region of an electrolyte solution in an electrolytic device.

7. The aluminum electrolytic capacitor of claim 6, wherein the sheet comprises a coextrusion product of the metal getter and the palladium compound.

8. The aluminum electrolytic capacitor of claim 6, wherein the metal getter is a foil having a thickness ranging from about 20 microns to about 400 microns.

9. The aluminum electrolytic capacitor of claim 6, wherein the combination comprises a coating of the palladium compound on a surface of the metal getter, wherein at least 10% of the surface of the metal getter is coated by the palladium compound.

10. The aluminum electrolytic capacitor of claim 4, wherein the metal getter comprises a component selected from the group consisting of Zr, Ti, Nb, Ta, and V metals; Zr alloyed with either Ti, Cr, Mn, Fe, Co, Ni, Al, Cu, Sn, Si, Y, La, any of the rare earth elements, or mixtures thereof; Ti alloyed with either Zr, Cr, Mn, Fe, Co, Ni, Al, Cu, Sn, Si, Y, La, any of the rare earth elements, or mixtures thereof; and, any mixture of the aforementioned metals and alloys.

11. The aluminum electrolytic capacitor of claim 4, wherein the metal getter is a non-evaporable getter consisting of 70% zirconium, 24.6% vanadium, and 5.4% iron, by weight.

12. The aluminum electrolytic capacitor of claim 4, wherein the metal getter is a non-evaporable getter consisting of 80.8% zirconium, 14.2% cobalt, and 5% TR, by weight; wherein, TR is a rare-earth metal, yttrium, lanthanum, or mixtures thereof, and includes mischmetals.

13. The aluminum electrolytic capacitor of claim 4, wherein the metal getter comprises titanium and the palladium compound comprises palladium.

14. An aluminum electrolytic capacitor comprising:
   at least two aluminum electrodes in a hermetic electrolytic environment; and
   a solid, composite getter for the sorption of gas in contact with the electrolytic environment and comprising a metal getter having a surface area in contact with a palladium compound, wherein the combination of the metal getter and palladium compound inhibits passivation of the getter material by the electrolytic environment;
   wherein the solid, composite getter comprises a combination of (i) a metal getter comprising zirconium or titanium and (ii) a palladium compound comprising palladium, an oxide of palladium, or a palladium alloy;
   wherein the palladium compound is a thin film having a thickness ranging from about 20 to about 400 nanometers; and
   wherein the composite getter is located in a porous container for retaining the metal getter in a desired region of the electrolytic capacitor.

15. The aluminum electrolytic capacitor of claim 14, wherein the composite getter contains preselected particle sizes ranging from about 10 μm to about 150 μm diameter, and the pores in the porous container are almost as large as the diameter of the smallest particles in the metal getter.

16. The aluminum electrolytic capacitor of claim 4 wherein the electrolytic environment is a liquid electrolyte.

* * * * *